United States Patent … US 10,606,641 B2
Knowles … Mar. 31, 2020

(54) SCHEDULING TASKS IN A MULTI-THREADED PROCESSOR

(71) Applicant: Graphcore Limited, Bristol (GB)

(72) Inventor: Simon Christian Knowles, Corston (GB)

(73) Assignee: Graphcore Limited, Bristol (GB)

( * ) Notice: Subject to any disclaimer, the term of this patent is extended or adjusted under 35 U.S.C. 154(b) by 0 days.

(21) Appl. No.: 16/166,000

(22) Filed: Oct. 19, 2018

(65) Prior Publication Data

US 2019/0155648 A1 May 23, 2019

Related U.S. Application Data

(63) Continuation-in-part of application No. 15/885,925, filed on Feb. 1, 2018.

(30) Foreign Application Priority Data

Oct. 20, 2017 (GB) .................................. 1717303.0
Oct. 17, 2018 (GB) .................................. 1816891.4

(51) Int. Cl.
 G06F 9/30 (2018.01)
 G06F 9/48 (2006.01)
 G06F 9/38 (2018.01)

(52) U.S. Cl.
 CPC .......... G06F 9/4887 (2013.01); G06F 9/3851 (2013.01)

(58) Field of Classification Search
 None
 See application file for complete search history.

(56) References Cited

U.S. PATENT DOCUMENTS 6,085,215 A * 7/2000 Ramakrishnan ...... G06F 9/4887
 718/102
6,233,599 B1 5/2001 Nation
 (Continued)

FOREIGN PATENT DOCUMENTS

JP 2008536224 9/2008
JP 2011103132 5/2011
 (Continued)

OTHER PUBLICATIONS

UK Combined Search and Examination Report for Application No. GB 1816891.4 dated Apr. 25, 2019.
 (Continued)

Primary Examiner — Corey S Faherty
(74) Attorney, Agent, or Firm — Haynes and Boone, LLP

(57) ABSTRACT

A processor comprising: an execution unit for executing a respective thread in each of a repeating sequence of time slots; and a plurality of context register sets, each comprising a respective set of registers for representing a state of a respective thread. The context register sets comprise a respective worker context register set for each of the number of time slots the execution unit is operable to interleave, and at least one extra context register set. The worker context register sets represent the respective states of worker threads and the extra context register set being represents the state of a supervisor thread. The processor is configured to begin running the supervisor thread in each of the time slots, and to enable the supervisor thread to then individually relinquish each of the time slots in which it is running to a respective one of the worker threads.

19 Claims, 3 Drawing Sheets

(56) References Cited

U.S. PATENT DOCUMENTS

2006/0026406 A1    2/2006  Gardner
2006/0146864 A1*   7/2006  Rosenbluth ........... G06F 9/3851
                                                        370/458
2007/0016759 A1    1/2007  Codrescu

FOREIGN PATENT DOCUMENTS

| JP | 2012234519 | 11/2012 |
| JP | 2014153860 | 8/2014 |
| TW | 200842757 A | 11/2008 |
| TW | I566174 B | 1/2017 |

OTHER PUBLICATIONS

Combined Search and Examination Report for United Kingdom Patent Application No. GB1816891.4 dated Apr. 25, 2019.
Office Action for Japanese Patent Application No. 2018-197310 dated Oct. 10, 2019. 4 pages.
Search Report for Taiwan Patent Application No. 107137040 dated Jan. 7, 2020.

* cited by examiner

SCHEDULING TASKS IN A MULTI-THREADED PROCESSOR

CROSS-REFERENCE TO RELATED APPLICATIONS

This Application claims priority under 35 U.S.C. § 120 as a continuation-in-part of U.S. application Ser. No. 15/885, 925, filed Feb. 1, 2018, the entire contents of which are incorporated herein by reference. This application also claims the priority benefit under 35 U.S.C. § 119 of United Kingdom Patent Application No. 1816891.4, filed Oct. 17, 2018 and United Kingdom Patent Application No. 1717303.0, filed Oct. 20, 2017, the entire contents of each of which are incorporated herein by reference.

TECHNICAL FIELD

The present disclosure relates to the scheduling of tasks to be performed by different concurrent threads in a multi-threaded processor.

BACKGROUND

A multi-threaded processor is a processor which is capable of executing multiple program threads alongside one another. The processor may comprise some hardware that is common to the multiple different threads (e.g. a common instruction memory, data memory and/or execution unit); but to support the multi-threading, the processor also comprises some dedicated hardware specific to each thread.

The dedicated hardware comprises at least a respective context register file for each of the number of threads that can be executed at once. A "context", when talking about multi-threaded processors, refers to the program state of a respective one of the threads being executed alongside one another (e.g. program counter value, status and current operand values). The context register file refers to the respective collection of registers for representing this program state of the respective thread. Registers in a register file are distinct from general memory in that register addresses are fixed as bits in instruction words, whereas memory addresses can be computed by executing instructions. The registers of a given context typically comprise a respective program counter for the respective thread, and a respective set of operand registers for temporarily holding the data acted upon and output by the respective thread during the computations performed by that thread. Each context may also have a respective status register for storing a status of the respective thread (e.g. whether it is paused or running). Thus each of the currently running threads has its own separate program counter, and optionally operand registers and status register(s).

One possible form of multi-threading is parallelism. That is, as well as multiple contexts, multiple execution pipelines are provided: i.e. a separate execution pipeline for each stream of instructions to be executed in parallel. However, this requires a great deal of duplication in terms of hardware.

Instead therefore, another form of multi-threaded processor employs concurrency rather than parallelism, whereby the threads share a common execution pipeline (or at least a common part of a pipeline) and different threads are interleaved through this same, shared execution pipeline. Performance of a multi-threaded processor may still be improved compared to no concurrency or parallelism, thanks to increased opportunities for hiding pipeline latency. Also, this approach does not require as much extra hardware dedicated to each thread as a fully parallel processor with multiple execution pipelines, and so does not incur so much extra silicon.

A multi-threaded processor also requires some means for coordinating the execution of the different concurrent threads. For example, it needs to be determined which computation tasks are to be allocated to which threads. As another example, a first one or more of the concurrent threads may contain a computation that is dependent on the result of a computation by one or more others of the concurrent threads. In this case a barrier synchronization needs to be performed to bring the threads in question to a common point of execution, so that the one or more first threads do not attempt to perform these dependent computations before the one or more other threads perform the computations upon which they are dependent. Instead, the barrier synchronization requires the other thread(s) to reach a specified point before the first thread(s) can proceed.

SUMMARY

One or more such functions to coordinate the execution of concurrent threads could be implemented in dedicated hardware. However, this increases the silicon footprint of the processor and is not as flexible as a programmatic software approach. On the other hand a fully programmatic software approach would not be efficient in terms of code density. It would be desirable to find a more subtle approach to coordinating threads, which strikes a balance between these two approaches.

According to one aspect disclosed herein, there is provided a processor comprising:
  an execution unit arranged to execute a respective thread in each of a repeating sequence of different time slots, the sequence consisting of a plural number of time slots in which the execution logic is operable to interleave execution of the respective threads; and
  a plural number of context register sets, each comprising a respective set of registers for representing a respective state of a respective thread, wherein the context register sets comprise a respective worker context register set for each of the number of time slots the execution unit is operable to interleave in said sequence and at least one extra context register set, such that the number of context register sets is at least one greater than the number of time slots the execution unit is operable to interleave, the worker context register sets being arranged to represent the respective states of respective worker threads which perform computation tasks, and the extra context register set being arranged to represent the state of a supervisor thread which schedules execution of the tasks performed by the worker threads;
  wherein the processor is configured to begin running the supervisor thread in each of the time slots, and to enable the supervisor thread to then individually relinquish each of the time slots in which it is running to a respective one of the worker threads.

In embodiments, the processor may be configured to enable the supervisor thread to perform said relinquishing by executing one or more relinquish instructions in the time slot in which it is running.

In embodiments, said one or more relinquish instructions are a single relinquish instruction.

In embodiments, the execution unit may be configured to operate according to an instruction set defining types of machine code instruction recognised by the processor, each machine code instruction defined by a respective opcode; wherein at least one of the one or more relinquish instructions may be a dedicated instruction of the instruction set having an opcode which when executed triggers said relinquishing.

In embodiments it is implicit in the opcode of said at least one relinquish instruction that the time slot being relinquished is the time slot in which said at least one relinquish instruction is executed.

In embodiments, said one or more instructions of the instruction set including at least said at least one relinquish instruction may be reserved for use by the supervisor thread and are not executable by the worker threads.

In embodiments, the one or more relinquish instructions may specify as an operand an address of the worker thread the relinquished time slot is being relinquished to.

In embodiments, the processor may be configured to enable the worker thread, to which one of the time slots has been relinquished, to return the time slot in which it is running to the supervisor thread by executing an exit instruction in the time slot in which it is running.

In embodiments, the execution unit may be configured to operate according to an instruction set defining types of machine code instruction recognized by the processor, each machine code instruction being defined by a respective opcode; wherein the exit instruction may be a dedicated instruction of the instruction set having an opcode which when executed performs said return of the relinquished time slot back to the supervisor thread.

In embodiments, it is implicit in the opcode of said exit instruction that the time slot being returned is the time slot in which the exit instruction is executed.

In embodiments, it is implicit in the opcode of said exit instruction that the thread to which the returned time slot is being returned is the supervisor thread.

In embodiments, one or more instructions of the instruction set including at least said exit instruction may be reserved for use by the worker threads and not executable by the supervisor thread.

In embodiments, the supervisor thread may perform a barrier synchronization for synchronising the worker threads.

In embodiments, the supervisor thread may perform communication with an external resource on behalf of one or more of the worker threads.

In embodiments, the relinquish instruction may further copy one or more modes from one or more status registers of the supervisor context register set to a corresponding one or more status registers of the worker launched by the relinquish instruction, thereby controlling the worker to adopt said one or more modes.

In embodiments, the processor may be further configured to execute an instruction which launches a set of more than one worker thread together in respective ones of said slots, all executing the same code.

In embodiments, the instruction set which the processor is configured to execute may further include a multi-run instruction which launches a plural number of worker threads together in respective ones of said slots, the plural number of worker threads being three or more; wherein one of the worker threads comprises code fetched from a first address specified by an operand of the multi-run instruction, and wherein the others of the plural number of worker threads comprise code fetched from respective addresses strided apart in steps of a stride value relative to the first address, wherein the stride value is specified by another operand of the multi-run instruction. That is, each other of the plural number of worker threads comprises code fetched from an address offset from said first address by a respective integer multiple of the stride value, wherein the integer multiples form the sequence of natural numbers (1, 2, 3, . . . ), i.e. the sequence of positive integers starting with 1 and spaced apart in increments of 1 (increasing by one with each time slot).

In embodiments, said number of worker threads may be equal to the number time slots. I.e. the multi-run instruction launches a thread in each of the time slots, each from a different respective one of a set of strided addresses specified by the first address and stride value operands of the multi-run instruction.

According to another aspect disclosed herein, there is provided method of operating a processor, the method comprising:

using an execution unit to execute a respective thread in each of a repeating sequence of different time slots, the sequence consisting of a plural number of time slots in which the execution logic is operable to interleave execution of the respective threads;

wherein the processor comprises a plural number of context register sets, each comprising a respective set of registers for representing a respective state of a respective thread, wherein the context register sets comprise a respective worker context register set for each of the number of time slots the execution unit is operable to interleave in said sequence and at least one extra context register set, such that the number of context register sets is at least one greater than the number of time slots the execution unit is operable to interleave, the worker context register sets being used to represent the respective states of respective worker threads which perform computation tasks, and the extra context register set being used to represent the state of a supervisor thread which schedules execution of the tasks performed by the worker threads; and the method further comprises beginning running the supervisor thread in each of the time slots, and the supervisor thread then individually relinquishing each of the time slots in which it is running to a respective one of the worker threads.

According to another aspect disclosed herein, there is provided a computer program product comprising code embodied on computer readable storage and being configured to execute on the processor of any embodiment disclosed herein, wherein the code comprises the supervisor thread and the worker threads.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

Figure 1:
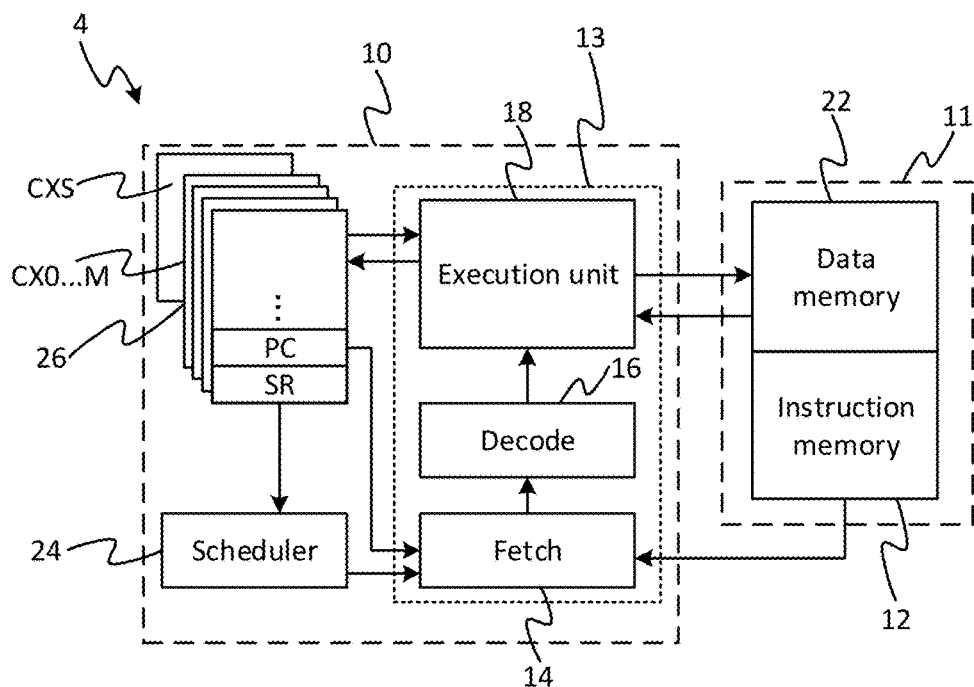
FIG. 1 is a schematic block diagram of a multi-threaded processor.

FIG. 1 illustrates an example of a processor 4 in accordance with embodiments of the present disclosure. For instance the processor 4 may be one of an array of like processor tiles on a same chip, or may be implemented on its own chip. The processor 4 comprises a multi-threaded processing unit 10 in the form of a barrel-threaded processing unit, and a local memory 11 (i.e. on the same tile in the case of a multi-tile array, or same chip in the case of a single-processor chip). A barrel-threaded processing unit is a type of multi-threaded processing unit in which the execution time of the pipeline is divided into a repeating sequence of interleaved time slots, each of which can be owned by a given thread. This will be discussed in more detail shortly. The memory 11 comprises an instruction memory 12 and a data memory 22 (which may be implemented in different addressable memory unit or different regions of the same addressable memory unit). The instruction memory 12 stores machine code to be executed by the processing unit 10, whilst the data memory 22 stores both data to be operated on by the executed code and data output by the executed code (e.g. as a result of such operations).

The memory 12 stores a variety of different threads of a program, each thread comprising a respective sequence of instructions for performing a certain task or tasks. Note that an instruction as referred to herein means a machine code instruction, i.e. an instance of one of the fundamental instructions of the processor's instruction set, consisting of a single opcode and zero or more operands.

The program described herein comprises a plurality of worker threads, and a supervisor subprogram which may be structured as one or more supervisor threads. These will be discussed in more detail shortly. In embodiments, each of some or all of the worker threads takes the form of a respective "codelet". A codelet is a particular type of thread, sometimes also referred to as an "atomic" thread. It has all the input information it needs to execute from the beginning of the thread (from the time of being launched), i.e. it does not take any input from any other part of the program or from memory after being launched. Further, no other part of the program will use any outputs (results) of the thread until it has terminated (finishes). Unless it encounters an error, it is guaranteed to finish. N.B. some literature also defines a codelet as being stateless, i.e. if run twice it could not inherit any information from its first run, but that additional definition is not adopted here. Note also that not all of the worker threads need be codelets (atomic), and in embodiments some or all of the workers may instead be able to communicate with one another.

Within the processing unit 10, multiple different ones of the threads from the instruction memory 12 can be interleaved through a single execution pipeline 13 (though typically only a subset of the total threads stored in the instruction memory can be interleaved at any given point in the overall program). The multi-threaded processing unit 10 comprises: a plurality of context register files 26 each arranged to represent the state (context) of a different respective one of the threads to be executed concurrently; a shared execution pipeline 13 that is common to the concurrently executed threads; and a scheduler 24 for scheduling the concurrent threads for execution through the shared pipeline in an interleaved manner, preferably in a round robin manner. The processing unit 10 is connected to a shared instruction memory 12 common to the plurality of threads, and a shared data memory 22 that is again common to the plurality of threads.

The execution pipeline 13 comprises a fetch stage 14, a decode stage 16, and an execution stage 18 comprising an execution unit which may perform arithmetic and logical operations, address calculations, load and store operations, and other operations, as defined by the instruction set architecture. Each of the context register files 26 comprises a respective set of registers for representing the program state of a respective thread.

Figure 2:
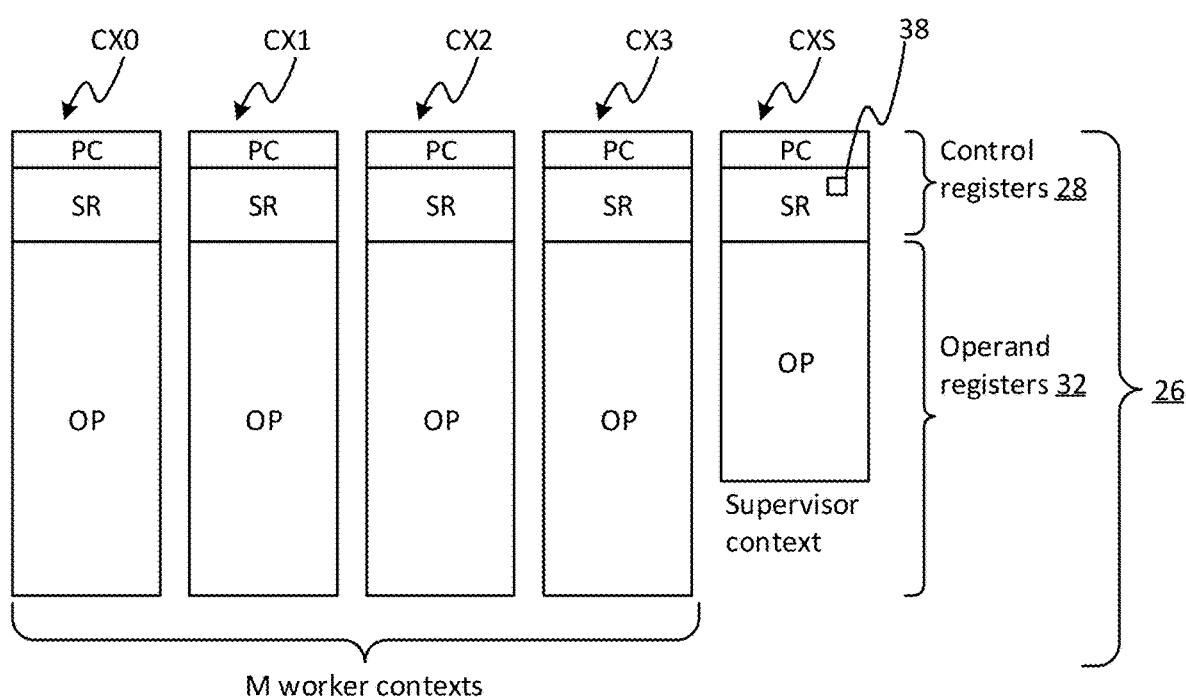
FIG. 2 is a schematic block diagram of a plurality of thread contexts.

An example of the registers making up each of the context register files 26 is illustrated schematically in FIG. 2. Each of the context register files 26 comprises a respective one or more control registers 28, comprising at least a program counter (PC) for the respective thread (for keeping track of the instruction address at which the thread is currently executing), and in embodiments also a set of one or more status registers (SR) recording a current status of the respective thread (such as whether it is currently running or paused, e.g. because it has encountered an error). Each of the context register files 26 also comprises a respective set of operand registers (OP) 32, for temporarily holding operands of the instructions executed by the respective thread, i.e. values operated upon or resulting from operations defined by the opcodes of the respective thread's instructions when executed. It will be appreciated that each of the context register files 26 may optionally comprise a respective one or more other types of register (not shown). Note also that whilst the term "register file" is sometimes used to refer to a group of registers in a common address space, this does not necessarily have to be the case in the present disclosure and each of the hardware contexts 26 (each of the register sets 26 representing each context) may more generally comprise one or multiple such register files.

As will be discussed in more detail later, the disclosed arrangement has one worker context register file CX0 . . . CX(M-1) for each of the number M of threads that can be executed concurrently (M=3 in the example illustrated but this is not limiting), and one additional supervisor context register file CXS. The worker context register files are reserved for storing the contexts of worker threads, and the supervisor context register file is reserved for storing the context of a supervisor thread. Note that in embodiments the supervisor context is special, in that it has a different number of registers than each of the workers. Each of the worker contexts preferably have the same number of status registers and operand registers as one another. In embodiments the supervisor context may have fewer operand registers than each of the workers. Examples of operand registers the worker context may have that the supervisor does not include: floating point registers, accumulate registers, and/or dedicated weight registers (for holding weights of a neural network). In embodiments the supervisor may also have a different number of status registers. Further, in embodiments the instruction set architecture of the processor 4 may be configured such that the worker threads and supervisor thread(s) execute some different types of instruction but also share some instruction types.

The fetch stage 14 is connected so as to fetch instructions to be executed from the instruction memory 12, under control of the scheduler 24. The scheduler 24 is configured to control the fetch stage 14 to fetch an instruction from each of a set of concurrently executing threads in turn in a repeating sequence of time slots, thus dividing the resources of the pipeline 13 into a plurality of temporally interleaved time slots, as will be discussed in more detail shortly. For example the scheduling scheme could be round-robin or weighted round-robin. Another term for a processor operating in such a manner is a barrel threaded processor.

In some embodiments, the scheduler 24 may have access to one of the status registers SR of each thread indicating whether the thread is paused, so that the scheduler 24 in fact controls the fetch stage 14 to fetch the instructions of only those of the threads that are currently active. In embodiments, preferably each time slot (and corresponding context register file) is always owned by one thread or another, i.e. each slot is always occupied by some thread, and each slot is always included in the sequence of the scheduler 24; though the thread occupying any given slot may happen to be paused at the time, in which case when the sequence comes around to that slot, the instruction fetch for the respective thread is passed over. Alternatively it is not excluded for example that in alternative, less preferred implementations, some slots can be temporarily vacant and excluded from the scheduled sequence. Where reference is made to the number of time slots the execution unit is operable to interleave, or such like, this refers to the maximum number of slots the execution unit is capable of executing concurrently, i.e. the number of concurrent slots the execution unit's hardware supports.

The fetch stage 14 has access to the program counter (PC) of each of the contexts. For each respective thread, the fetch stage 14 fetches the next instruction of that thread from the next address in the program memory 12 as indicated by the program counter. The program counter increments each execution cycle unless branched by a branch instruction. The fetch stage 14 then passes the fetched instruction to the decode stage 16 to be decoded, and the decode stage 16 then passes an indication of the decoded instruction to the execution unit 18 along with the decoded addresses of any operand registers 32 specified in the instruction, in order for the instruction to be executed. The execution unit 18 has access to the operand registers 32 and the control registers 28, which it may use in executing the instruction based on the decoded register addresses, such as in the case of an arithmetic instruction (e.g. by adding, multiplying, subtracting or dividing the values in two operand registers and outputting the result to another operand register of the respective thread). Or if the instruction defines a memory access (load or store), the load/store logic of the execution unit 18 loads a value from the data memory into an operand register of the respective thread, or stores a value from an operand register of the respective thread into the data memory 22, in accordance with the instruction. Or if the instruction defines a branch or a status change, the execution unit changes value in the program counter PC or one of the status registers SR accordingly. Note that while one thread's instruction is being executed by the execution unit 18, an instruction from the thread in the next time slot in the interleaved sequence can be being decoded by the decode stage 16; and/or while one instruction is being decoded by the decode stage 16, the instruction from the thread in the next time slot after that can be being fetched by the fetch stage 14 (though in general the scope of the disclosure is not limited to one instruction per time slot, e.g. in alternative scenarios a batch of two or more instructions could be issued from a given thread per time slot). Thus the interleaving advantageously hides latency in the pipeline 13, in accordance with known barrel threaded processing techniques.

Figure 3:
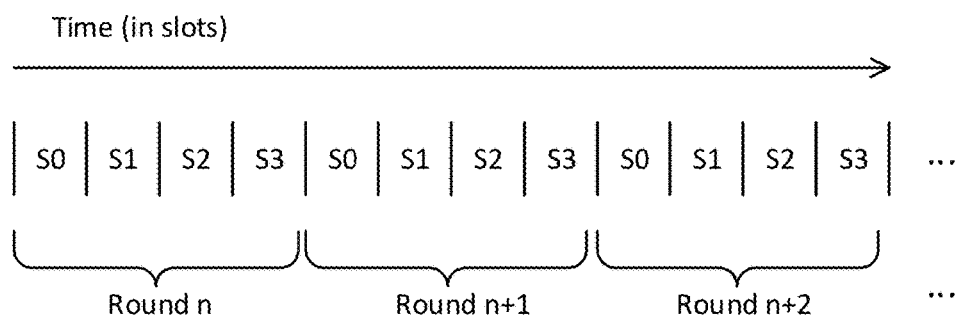
FIG. 3 schematically illustrates a scheme of interleaved time slots.

An example of the interleaving scheme implemented by the scheduler 24 is illustrated in FIG. 3. Here the concurrent threads are interleaved according to a round-robin scheme whereby, within each round of the scheme, the round is divided into a sequence of time slots S0, S1, S2 . . . , each for executing a respective thread. Typically each slot is one processor cycle long and the different slots are evenly sized, though not necessarily so in all possible embodiments, e.g. a weighted round-robin scheme is also possible whereby some threads get more cycles than others per execution round. In general the barrel-threading may employ either an even round-robin or a weighted round-robin schedule, where in the latter case the weighting may be fixed or adaptive.

Whatever the sequence per execution round, this pattern then repeats, each round comprising a respective instance of each of the time slots. Note therefore that a time slot as referred to herein means the repeating allocated place in the sequence, not a particular instance of the time slot in a given repetition of the sequence. Put another way, the scheduler 24 apportions the execution cycles of the pipeline 13 into a plurality of temporally interleaved (time-division multiplexed) execution channels, with each comprising a recurrence of a respective time slot in a repeating sequence of time slots. In the illustrated embodiment, there are four time slots, but this is just for illustrative purposes and other numbers are possible. E.g. in one preferred embodiment there are in fact six time slots.

Whatever the number of time slots the round-robin scheme is divided into, then according to present disclosure, the processing unit 10 comprises one more context register file 26 than there are time slots, i.e. it supports one more context than the number of interleaved timeslots it is capable of barrel-threading.

This is illustrated by way of example in FIG. 2: if there are four time slots S0 . . . S3 as shown in FIG. 3, then there are five context register files, labelled here CX0, CX1, CX2, CX3 and CXS. That is, even though there are only four execution time slots S0 . . . S3 in the barrel-threaded scheme and so only four threads can be executed concurrently, it is disclosed herein to add a fifth context register file CXS, comprising a fifth program counter (PC), a fifth set of operand registers 32, and in embodiments also a fifth set of one or more status registers (SR). Though note that as mentioned, in embodiments the supervisor context may differ from the others CX0 . . . 3, and the supervisor thread may support a different set of instructions for operating the execution pipeline 13.

Each of the first four contexts CX0 . . . CX3 is used to represent the state of a respective one of a plurality of "worker threads" currently assigned to one of the four execution time slots S0 . . . S3, for performing whatever application-specific computation tasks are desired by the programmer (note again this may only be subset of the total number of worker threads of the program as stored in the instruction memory 12). The fifth context CXS however, is reserved for a special function, to represent the state of a "supervisor thread" (SV) whose role it is to coordinate the execution of the worker threads, at least in the sense of assigning which of the worker threads W is to be executed in which of the time slots S0, S1, S2 . . . at what point in the overall program. Optionally the supervisor thread may have other "overseer" or coordinating responsibilities. For example, the supervisor thread may be responsible for performing barrier synchronisations to ensure a certain order of execution. E.g. in a case where one or more second threads are dependent on data to be output by one or more first threads run on the same processor module 4, the supervisor may perform a barrier synchronization to ensure that none of the second threads begins until the first threads have finished. And/or, the supervisor may perform a barrier synchronization to ensure that one or more threads on the processor module 4 do not begin until a certain external source of data, such as another tile or processor chip, has completed the processing required to make that data available. The supervisor thread may also be used to perform other functionality relating to the multiple worker threads. For example, the supervisor thread may be responsible for communicating data externally to the processor 4 (to receive external data to be acted on by one or more of the threads, and/or to transmit data output by one or more of the worker threads). In general the supervisor thread may be used to provide any kind of overseeing or coordinating function desired by the programmer. For instance as another example, the supervisor may oversee transfer between the tile local memory 12 and one or more resources in the wider system (external to the array 6) such as a storage disk or network card.

Note of course that four time slots is just an example, and generally in other embodiments there may be other numbers, such that if there are a maximum of M time slots 0 . . . M−1 per round, the processor 4 comprises M+1 contexts CX . . . CX(M−1) & CXS, i.e. one for each worker thread that can be interleaved at any given time and an extra context for the supervisor. E.g. in one exemplary implementation there are six timeslots and seven contexts.

Figure 4:
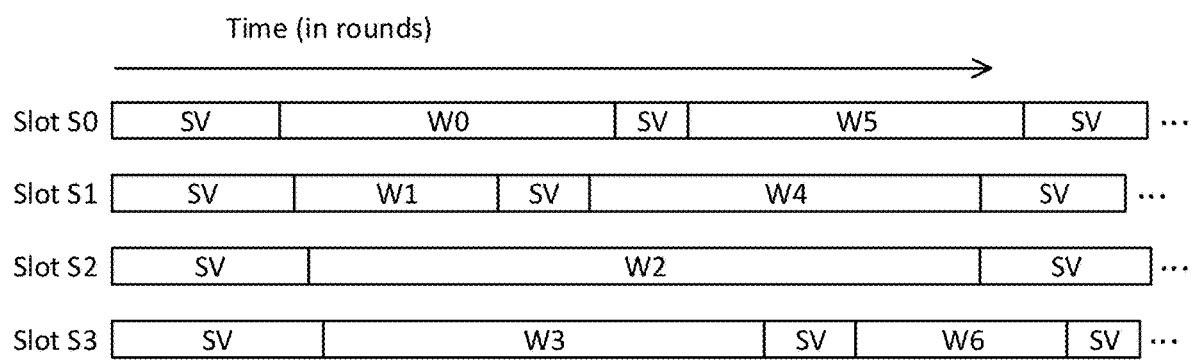
FIG. 4 schematically illustrates a supervisor thread and plurality of worker threads running in a plurality of interleaved time slots.

Referring to FIG. 4, in accordance with the teachings herein, the supervisor thread SV does not have its own time slot per se in the scheme of interleaved execution time slots. Nor do the workers as allocation of slots to worker threads is flexibly defined. Rather, each time slot has its own dedicated context register file (CX0 . . . CXM−1) for storing worker context, which is used by the worker when the slot is allocated to the worker, but not used when the slot is allocated to the supervisor. When a given slot is allocated to the supervisor, that slot instead uses the context register file CVS of the supervisor. Note that the supervisor always has access to its own context and no workers are able to occupy the supervisor context register file CXS.

The supervisor thread SV has the ability to run in any and all of the time slots S0 . . . S3 (or more generally S0 . . . SM−1). The scheduler 24 is configured so as, when the program as a whole starts, to begin by allocating the supervisor thread to all of the time slots, i.e. so the supervisor SV starts out running in all of S0 . . . S3. However, the supervisor thread is provided with a mechanism for, at some subsequent point (either straight away or after performing one or more supervisor tasks), temporarily relinquishing each of the slots in which it is running to a respective one of the worker threads, e.g. initially workers W0 . . . W3 in the example shown in FIG. 4. This is achieved by the supervisor thread executing a relinquish instruction, called "RUN" by way of example herein. In embodiments this instruction takes two operands: an address of a worker thread in the instruction memory 12 and an address of some data for that worker thread in the data memory 22:

RUN task_addr, data_addr

The worker threads are portions of code that can be run concurrently with one another, each representing one or more respective computation tasks to be performed. The data address may specify some data to be acted upon by the worker thread. Alternatively, the relinquish instruction may take only a single operand specifying the address of the worker thread, and the data address could be included in the code of the worker thread; or in another example the single operand could point to a data structure specifying the addresses of the worker thread and data. As mentioned, in embodiments at least some of the workers may take the form of codelets, i.e. atomic units of concurrently executable code. Alternatively or additionally, some of the workers need not be codelets and may instead be able to communicate with one another.

The relinquish instruction ("RUN") acts on the scheduler 24 so as to relinquish the current time slot, in which this instruction is itself executed, to the worker thread specified by the operand. Note that it is implicit in the relinquish instruction that it is the time slot in which this instruction is executed that is being relinquished (implicit in the context of machine code instructions means it doesn't need an operand to specify this—it is understood implicitly from the opcode itself). Thus the time slot which is given away is the time slot in which the supervisor executes the relinquish instruction. Or put another way, the supervisor is executing in the same space that that it gives away. The supervisor says "run this piece of code at this location", and then from that point onwards the recurring slot is owned (temporarily) by the relevant worker thread.

The supervisor thread SV performs a similar operation in each of one or more others of the time slots, to give away some or all of its time slots to different respective ones of the worker threads W0 . . . W3 (selected from a larger set W0 . . . Wj in the instruction memory 12). Once it has done so for the last slot, the supervisor is suspended (then later will resume where it left off when one of the slots is handed back by a worker W).

The supervisor thread SV is thus able to allocate different worker threads, each performing one or more tasks, to different ones of the interleaved execution time slots S0 . . . S3. When the supervisor thread determines it is time to run a worker thread, it uses the relinquish instruction ("RUN") to allocate this worker to the time slot in which the RUN instruction was executed.

In some embodiments, the instruction set also comprises a variant of the run instruction, RUNALL ("run all"). This instruction is used to launch a set of more than one worker together, all executing the same code. In embodiments this launches a worker in every one of the processing unit's slots S0 . . . S3 (or more generally S0 . . . S(M−1)).

As an alternative or in addition to the RUNALL instruction, in some embodiments the instruction set may include a "multi-run" instruction, MULTIRUN. This instruction also launches multiple worker threads, each in a respective one of the time slots. In preferred embodiments it launches a respective worker thread W in each of all of the slots S0 . . . S(M−1) (i.e. the total number of worker threads launched is equal to the number M of hardware worker contexts). However, MULTIRUN differs from the RUNALL instruction in that the multiple launched threads do not all consist of the same code taken from the same task address. Rather, the MULTIRUN takes at least two operands: a first, explicit task address; and a stride value:

MULTIRUN Task_Addr, Stride

A first one of the multiple launched threads is taken from the address task_addr specified by the address operand of the MULTIRUN instruction. Each other of the multiple launched threads is taken from an address equal to that of the first thread plus a respective, incremental integer multiple of the stride value, the multiples being the sequence of positive integers starting from 1 and incrementing by 1 with each time slot. In other words the launched worker threads are strided apart in steps of the stride value relative to the first address. I.e. so a second one of the threads is taken from an address=task_addr+stride, a third one of the threads is taken from an address=task_addr+2*stride, and a fourth one of the threads is taken from an address=task_addr+3*stride (and so forth depending on the number of launched threads, which in embodiments is equal to the number of slots S). The execution of the MULTIRUN instruction triggers each of the M multiple workers to be launched in a respective one of the slots S0 . . . S(M−1), each starting with a program counter defined by the respective address value determined as specified above.

Further, in some embodiments the RUN, RUNALL and/or MULTIRUN instruction, when executed, also automatically copies some status from one or more of the supervisor status registers CXS(SR) to a corresponding one or more status registers of the worker thread(s) launched by the RUN or RUNALL. For instance the copied status may comprise one or more modes, such as a floating point rounding mode (e.g. round to nearest or round to zero) and/or an overflow mode (e.g. saturate or use a separate value representing infinity). The copied status or mode then controls the worker in question to operate in accordance with the copied status or mode. In embodiments, the worker can later overwrite this in its own status register (but cannot change the supervisor's status). In further alternative or additional embodiments, the workers can choose to read some status from one or more status registers of the supervisor (and again may change their own status later). E.g. again this could be to adopt a mode from the supervisor status register, such as a floating point mode or a rounding mode. In embodiments however, the supervisor cannot read any of the context registers CX0 . . . of the workers.

Once launched, each of the currently allocated worker threads W0 . . . W3 proceeds to perform the one or more computation tasks defined in the code specified by the respective relinquish instruction. At the end of this, the respective worker thread then hands the time slot in which it is running back to the supervisor thread. This is achieved by executing an exit instruction ("EXIT"). In some embodiments this does not take any operands:

EXIT

Alternatively, in other embodiments the EXIT instruction takes a single operand exit_state (e.g. a binary value), to be used for any purpose desired by the programmer to indicate a state of the respective codelet upon ending (e.g. to indicate whether a certain terminal condition is met or an error has occurred):

EXIT Exit_State

Either way, the EXIT instruction acts on the scheduler 24 so that the time slot in which it is executed is returned back to the supervisor thread. The supervisor thread can then perform one or more subsequent supervisor tasks (e.g. barrier synchronization and/or exchange of data), and/or continue to execute another relinquish instruction to allocate a new worker thread (W4, etc.) to the slot in question. Note again therefore that the total number of worker threads in the instruction memory 12 may be greater than the number that barrel-threaded processing unit 10 can interleave at any one time. It is the role of the supervisor thread SV to schedule which of the worker threads W0 . . . Wj from the instruction memory 12, at which stage in the overall program, are to be assigned to which of the interleaved time slots S0 . . . SM in the round robin schedule of the scheduler 24.

In embodiments, there is also another way in which a worker thread may return its time slot back to the supervisor thread. That is, the execution unit 18 comprises an exception mechanism configured so as, when a worker thread encounters an exception, it may automatically return its time slot to the supervisor. In this case the individual exit state may be set to a default value or may be left untouched.

Further, in embodiments the processing unit 10 may be configured such that one or more instructions of the instruction set are reserved for use by the supervisor thread and not the worker threads, and/or one or more instructions of the instruction set are reserved for use by the worker threads and not the supervisor thread. E.g. this may be enforced in the execution stage 18, decode stage 16 or fetch stage 14, assuming the relinquish (RUN) and exit (EXIT) instructions act on the relevant stage to inform it of which type of thread is currently occupying the slot in question. In such cases, the supervisor-specific instructions include at least the relinquish instruction, but could also include other instructions such as one or more barrier synchronization instructions if the processing unit 10 contains dedicated logic for performing barrier synchronization. Also, the worker-specific instructions include at least the exit instruction, but may also include other instructions such as floating-point operations (which are prone to errors).

Figure 5:
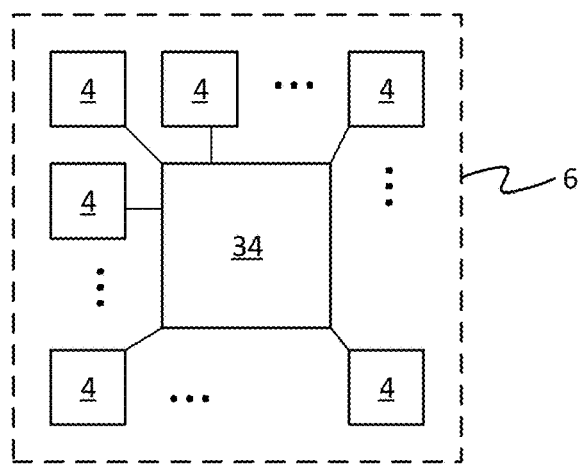
FIG. 5 is a schematic block diagram of a processor comprising an array of constituent processors.

The processor 4 described above may be used a single, stand-alone processor comprising a single instance of the processing unit 10 and memory 11. Alternatively however, as illustrated in FIG. 5, in some embodiments the processor 4 may be one of multiple processors in an array 6, integrated on the same chip, or spanning multiple chips. In this case the processors 4 are connected together via a suitable interconnect 34 enabling them to communicate data with one another, including results of one or more computations performed by one, some or all of the different worker threads across the array. For instance the processor 4 may be one of multiple tiles in a wider, multi-tile processor implemented on a single chip, each tile comprising its own respective instance of the barrel-threaded processing unit 10 and associated memory 11, each configured as described above in relation to FIGS. 1 to 4. For completeness, note also that an "array" as referred to herein does not necessarily imply any particular number of dimensions or physical layout of the tiles or processors 4. In some such embodiments, the supervisor may be responsible for performing exchanges between tiles.

In some embodiments, the EXIT instruction is given a further special function, namely to cause the exit state specified in the operand of the EXIT instruction to be automatically aggregated (by dedicated hardware logic) with the exit states of a plurality of other worker threads being run through the same pipeline 13, each such worker having a respective exit state specified as the operand of its own instance of the EXIT instruction. This may be to aggregate the specified exit state with the exit states of all the worker threads being run by the same processor module 4 (i.e. through the same pipeline 13 of a given processing unit 10), or at least all those in a specified phase. In some embodiments further instructions may be executed to aggregate with the exits states of worker threads being run on one or more other processors in an array 6 (which may be other tiles on the same chip or even on other chips). Either way, the processor 4 comprises at least one register 38 specifically arranged to store the locally aggregated exit state of the processor 4. In embodiments this is one of the supervisor's status registers in the supervisor's context register file CXS. When each EXIT instruction is executed by the respective thread, the dedicated aggregation logic causes the exit state specified in the EXIT instruction's operand to contribute toward the aggregated exit state stored in the exit state register 38. At any time, e.g. once all the workers of interest have terminated by means of a respective exit instruction, the supervisor thread can then access the exit state from the exit state register 38. This may comprise accessing its own status register SR.

The aggregation logic is implemented in dedicated hardware circuitry in the execution unit 18. Thus an extra, implicit facility is included in the instruction for terminating a worker thread. Dedicated circuitry or hardware means circuitry having a hard-wired function, as opposed to being programmed in software using general purpose code. The updating of the locally aggregated exit state (in register 38) is triggered by the execution of the opcode of the special EXIT instruction, this being one of the fundamental machine code instructions in the instruction set of the processor 4, having the inherent functionality of aggregating the exit states. Also, the locally aggregated exit state is stored in a register 38, meaning a dedicated piece of storage (in embodiments a single bit of storage) whose value can be accessed by the code running on the pipeline. Preferably the exit state register 38 forms one of the status registers of the supervisor.

As an example, the exit states of the individual threads and the aggregated exit state may each take the form of a single bit, i.e. 0 or 1, and the aggregation logic may be configured to take a logical AND of the individual worker exit states. This means that any input being 0 results in an aggregate of 0, but if all the inputs are 1 then the aggregate is 1. I.e. if a 1 is used to represent a true or successful outcome, this means that if any of the local exit states of any of the worker threads is false or unsuccessful, then the overall aggregated exit state will also be false or represent an unsuccessful outcome. E.g. this could be used to determine whether or not the workers have all satisfied a terminal condition. Thus, the supervisor subprogram can query a single register (in embodiments a single bit) to ask "did anything go wrong? Yes or no", rather than having to examine the individual states of the individual worker threads on each individual tile. In fact in embodiments, the supervisor is not able to query a worker at any arbitrary point and does not have access to the state of the workers, making the exit state register 38 the only means of determining the outcome of a worker thread. The supervisor does not know which context register file corresponds to which worker thread, and after the worker EXITs, the worker state disappears. The only other way for the supervisor to determine an output of a worker thread would be for the worker to leave a message in general purpose data memory 22.

An equivalent to the above logic would be to replace the AND with an OR gate and to invert the interpretation of the exit states 0 and 1 in software, i.e. 0→true, 1→false. Equivalently if the AND gate is replaced with an OR gate but the interpretation of the exit states is not inverted, nor the reset value, then the aggregated state in $LC will record whether any (rather than all) the worker states exited with state 1. In other embodiments, the exit states need not be single bits. E.g. the exit state of each individual worker may be a single bit, but the aggregated exit state may comprise two bits representing a trinary state: all workers exited with state 1, all workers exited with state 0, or the workers' exit states were mixed. As an example of the logic for implementing this, one of the two bits encoding the trinary value may be a Boolean AND of the individual exit states, and the other bit of the trinary value may be a Boolean OR of the individual exit states. The third encoded case, indicating that the worker's exit states were mixed, can then be formed as the XOR of these two bits.

The exit states can be used to represent whatever the programmer wishes, but one particularly envisaged example is to use an exit state of 1 to indicate that the respective worker thread has exited in a "successful" or "true" state, whilst an exit state of 0 indicates the respective worker thread exited in an "unsuccessful" or "false" state (or vice versa if the aggregation circuitry performs an OR instead of an AND and the register $LC 38 is reset initially to 0). For instance, consider an application where each worker thread performs a computation having an associated condition, such as a condition indicating whether the error(s) in the one or more parameters of a respective node in the graph of a machine intelligence algorithm has/have fallen within an acceptable level according to a predetermined metric. In this case, an individual exit state of one logical level (e.g. 1) may be used to indicate that the condition is satisfied (e.g. the error or errors in the one or more parameters of the node are within an acceptable level according to some metric); whilst an individual exit state of the opposite logical level (e.g. 0) may be used to indicate that the condition was not satisfied (e.g. the error or errors are not within an acceptable level according to the metric in question). The condition may for example be an error threshold placed on a single parameter or each parameter, or could be a more complex function of a plurality of parameters associated with the respective computation performed by the worker thread.

As another more complex example, the individual exit states of the workers and the aggregated exit state may each comprise two or more bits, which may be used, for example, to represent a degree of confidence in the results of the worker threads. E.g. the exit state of each individual worker thread may represent a probabilistic measure of confidence in a result of the respective worker thread, and the aggregation logic may be replaced with more complex circuitry for performing a probabilistic aggregation of the individual confidence levels in hardware.

Whatever meaning is given by the programmer to the exit states, the supervisor thread SV can then access the aggregated value from the exit state register 38 to determine the aggregated exit state of all the worker threads that exited since it was last reset, for example at the last synchronization point, e.g. to determine whether or not all the workers exited in a successful or true state. In dependence on this aggregated value, the supervisor thread may then make a decision in accordance with the programmer's design. The programmer can choose to make whatever use of the locally aggregated exit state that he or she wishes, e.g. to determine whether to raise an exception, or to perform a branch decision in dependence on the aggregated exit state. For example, the supervisor thread may consult the local aggregated exit state in on order to determine whether a certain portion of the program made up of a plurality of worker threads has completed as expected or desired. If not (e.g. at least one of the worker threads exited in an unsuccessful or false state), it may report to a host processor, or may perform another iteration of the part of the program comprising the same worker threads; but if so (e.g. all the worker threads exited in a successful or true state) it may instead branch to another part of the program comprising one or more new workers.

Preferably the supervisor subprogram should not access the value in the exit state register 38 until all the worker threads in question have exited, such that the value stored therein represents the correct, up-to-date aggregate state of all the desired threads. Waiting for this may be enforced by a barrier synchronization performed by the supervisor thread to wait for all currently-running local worker threads (i.e. those on the same processor module 4, running through the same pipeline 13) to exit. That is, the supervisor thread resets the exit state register 38, launches a plurality of worker threads, and then initiates a barrier synchronization in order to wait for all the outstanding worker threads to exit before the supervisor is allowed to proceed to get the aggregated exit state from the exit state register 38.

Figure 6:
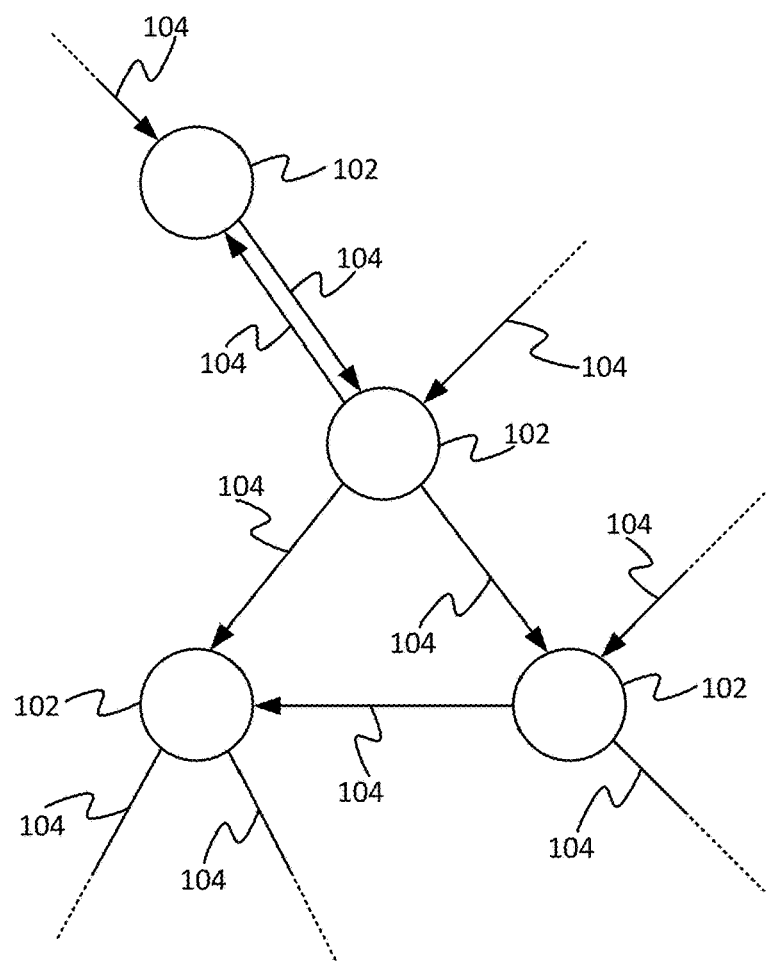
FIG. 6 is a schematic illustration of a graph used in a machine intelligence algorithm.

FIG. 6 illustrates an example application of the processor architecture disclosed herein, namely an application to machine intelligence.

As will be familiar to a person skilled in the art of machine intelligence, machine intelligence begins with a learning stage where the machine intelligence algorithm learns a knowledge model. The model comprises a graph of interconnected nodes (i.e. vertices) 102 and edges (i.e. links) 104. Each node 102 in the graph has one or more input edges and one or more output edges. Some of the input edges of some of the nodes 102 are the output edges of some others of the nodes, thereby connecting together the nodes to form the graph. Further, one or more of the input edges of one or more of the nodes 102 form the inputs to the graph as a whole, and one or more of the output edges of one or more of the nodes 102 form the outputs of the graph as a whole. Sometimes a given node may even have all of these: inputs to the graph, outputs from the graph and connections to other nodes. Each edge 104 communicates a value or more often a tensor (n-dimensional matrix), these forming the inputs and outputs provided to and from the nodes 102 on their input and output edges respectively.

Each node 102 represents a function of its one or more inputs as received on its input edge or edges, with the result of this function being the output(s) provided on the output edge or edges. Each function is parameterized by one or more respective parameters (sometimes referred to as weights, though they need not necessarily be multiplicative weights). In general the functions represented by the different nodes 102 may be different forms of function and/or may be parameterized by different parameters.

Further, each of the one or more parameters of each node's function is characterized by a respective error value. Moreover, a respective condition may be associated with the error(s) in the parameter(s) of each node 102. For a node 102 representing a function parameterized by a single parameter, the condition may be a simple threshold, i.e. the condition is satisfied if the error is within the specified threshold but not satisfied if the error is beyond the threshold. For a node 102 parameterized by more than one respective parameter, the condition for that node 102 having reached an acceptable level of error may be more complex. For example, the condition may be satisfied only if each of the parameters of that node 102 falls within respective threshold. As another example, a combined metric may be defined combining the errors in the different parameters for the same node 102, and the condition may be satisfied on condition that the value of the combined metric falls within a specified threshold, but otherwise the condition is not satisfied if the value of the combined metric is beyond the threshold (or vice versa depending on the definition of the metric). Whatever the condition, this gives a measure of whether the error in the parameter(s) of the node falls below a certain level or degree of acceptability. In general any suitable metric may be used. The condition or metric may be the same for all nodes, or different for different respective ones of the nodes.

In the learning stage the algorithm receives experience data, i.e. multiple data points representing different possible combinations of inputs to the graph. As more and more experience data is received, the algorithm gradually tunes the parameters of the various nodes 102 in the graph based on the experience data so as to try to minimize the errors in the parameters. The goal is to find values of the parameters such that the output of the graph is as close as possible to a desired output for a given input. As the graph as a whole tends toward such a state, the graph is said to converge. After a suitable degree of convergence the graph can then be used to perform predictions or inferences, i.e. to predict an outcome for some given input or infer a cause for some given output.

The learning stage can take a number of different possible forms. For instance, in a supervised approach, the input experience data takes the form of training data, i.e. inputs which correspond to known outputs. With each data point, the algorithm can tune the parameters such that the output more closely matches the known output for the given input. In the subsequent prediction stage, the graph can then be used to map an input query to an approximate predicted output (or vice versa if making an inference). Other approaches are also possible. For instance, in an unsupervised approach, there is no concept of a reference result per input datum, and instead the machine intelligence algorithm is left to identify its own structure in the output data. Or in a reinforcement approach, the algorithm tries out at least one possible output for each data point in the input experience data, and is told whether this output is positive or negative (and potentially a degree to which it is positive or negative), e.g. win or lose, or reward or punishment, or such like. Over many trials the algorithm can gradually tune the parameters of the graph to be able to predict inputs that will result in a positive outcome. The various approaches and algorithms for learning a graph will be known to a person skilled in the art of machine learning.

According to an exemplary application of the techniques disclosed herein, each worker thread is programmed to perform the computations associated with a respective individual one of the nodes 102 in a machine intelligence graph. In this case at least some of the edges 104 between nodes 102 correspond to the exchanges of data between threads, and some may involve exchanges between tiles. Furthermore, the individual exit states of the worker threads are used by the programmer to represent whether or not the respective node 102 has satisfied its respective condition for convergence of the parameter(s) of that node, i.e. has the error in the parameter or parameters fallen within the acceptable level or region in error space. For instance, this is one example use of the embodiments where each of the individual exit states is an individual bit and the aggregated exit state is an AND of the individual exit states (or equivalently an OR if 0 is taken to be positive); or where the aggregated exit state is a trinary value representing whether the individual exit states were all true, all false or mixed. Thus, by examining a single register value in the exit state register 38, the program can determine whether the graph as whole, or at least a sub-region of the graph, has converged to an acceptable degree.

As another variant of this, embodiments may be used where the aggregation takes the form of a statistical aggregation of individual confidence values. In this case each individual exit state represents a confidence (e.g. as a percentage) that the parameters of the node represented by the respective thread have reached an acceptable degree of error. The aggregated exit state can then be used to determine an overall degree of confidence as to whether the graph, or a subregion of the graph, has converged to an acceptable degree.

In the case of a multi-tile arrangement 6, each tile runs a subgraph of the graph. Each subgraph comprises a supervisor subprogram comprising one or more supervisor threads, and a set of worker threads in which some or all of the workers may take the form of codelets.

In such applications, or indeed any graph-based application where each worker thread is used to represent a respective node in a graph, the "codelet" comprised by each worker may be defined as a software procedure operating on the persistent state and the inputs and/outputs of one vertex, wherein the codelet:
- is launched on one worker thread register context, to run in one barrel slot, by the supervisor thread executing a "run" instruction;
- runs to completion without communication with other codelets or the supervisor (except for the return to the supervisor when the codelet exits);
- has access to the persistent state of a vertex via a memory pointer provided by the "run" instruction, and to a non-persistent working area in memory which is private to that barrel slot; and
- executes "EXIT" as its last instruction, whereupon the barrel slot which it was using is returned to the supervisor, and the exit state specified by the exit instruction is aggregated with the local exit state of the tile which is visible to the supervisor.

To update a graph (or sub-graph) means to update each constituent vertex once, in any order consistent with the causality defined by the edges. To update a vertex means to run a codelet on the vertex state. A codelet is an update procedure for vertices—one codelet is usually associated with many vertices. The supervisor executes one RUN instruction per vertex, each such instruction specifying a vertex state address and a codelet address.

It will be appreciated that the above embodiments have been described by way of example only.

For instance, the applicability of the present disclosure is not limited to the particular processor architecture outlined in relation to FIGS. 2 and 3, and in general the concepts disclosed herein can apply to any processor architecture having a plurality of execution time slots, by adding at least one more context than there are possible time slots.

Note also that it is not excluded that yet further contexts beyond the number of time slots could be included for other purposes. E.g. some processors include debugging context which never represents an actual running thread, but is used by a thread when it encounters an error in order to store the program state of the erroneous thread to be analysed later by the program developer for debugging purposes.

Furthermore, the role of the supervisor thread is not just limited to barrier synchronisation and/or exchange of data between threads, and in other embodiments it could alternatively or additionally be responsible for any other functionality involving a visibility of two or more of the worker threads. For example, in embodiments where the program comprises multiple iterations of a graph, the supervisor thread may be responsible for determining how many iterations of the graph to perform, which may depend on a result of a previous iteration.

Other variants or applications of the disclosed techniques may become apparent to a person skilled in the art given the disclosure herein. The scope of the disclosure is not limited by the example embodiments discussed above, but only by the accompanying claims.

What is claimed is:

1. A processor comprising:
    an execution unit arranged to execute a respective thread in each of a repeating sequence of different time slots, the sequence consisting of a plural number of time slots in which the execution logic is operable to interleave execution of the respective threads; and
    a plural number of context register sets, each comprising a respective set of registers for representing a respective state of a respective thread, wherein the context register sets comprise a respective worker context register set for each of the number of time slots the execution unit is operable to interleave in said sequence and at least one extra context register set, such that the number of context register sets is at least one greater than the number of time slots the execution unit is operable to interleave, the worker context register sets being arranged to represent the respective states of respective worker threads which perform computation tasks, and the extra context register set being arranged to represent the state of a supervisor thread which schedules execution of the tasks performed by the worker threads;
    wherein the processor is configured to begin running the supervisor thread in each of the time slots, and to enable the supervisor thread to then individually relinquish each of the time slots in which it is running to a respective one of the worker threads.

2. The processor of claim 1, wherein the processor is configured to enable the supervisor thread to perform said relinquishing by executing one or more relinquish instructions in the time slot in which it is running.

3. The processor of claim 2, wherein said one or more relinquish instructions are a single relinquish instruction.

4. The processor of claim 2, wherein the execution unit is configured to operate according to an instruction set defining types of machine code instruction recognised by the processor, each machine code instruction defined by a respective opcode; and wherein at least one of the one or more relinquish instructions is a dedicated instruction of the instruction set having an opcode which when executed triggers said relinquishing.

5. The processor of claim 4, wherein it is implicit in the opcode of said at least one relinquish instruction that the time slot being relinquished is the time slot in which said at least one relinquish instruction is executed.

6. The processor of any of claim 4, wherein one or more instructions of the instruction set including at least said one or more relinquish instructions are reserved for use by the supervisor thread and are not executable by the worker threads.

7. The processor of claim 1, wherein the one or more relinquish instructions specify as an operand an address of the worker thread the relinquished time slot is being relinquished to.

8. The processor of claim 1, wherein the processor is configured to enable the worker thread, to which one of the time slots has been relinquished, to return the time slot in which it is running to the supervisor thread by executing an exit instruction in the time slot in which it is running.

9. The processor of claim 8, wherein the execution unit is configured to operate according to an instruction set defining types of machine code instruction recognized by the processor, each machine code instruction being defined by a respective opcode; and wherein the exit instruction is a dedicated instruction of the instruction set having an opcode which when executed performs said return of the relinquished time slot back to the supervisor thread.

10. The processor of claim 9, wherein it is implicit in the opcode of said exit instruction that the time slot being returned is the time slot in which the exit instruction is executed.

11. The processor of claim 9, wherein it is implicit in the opcode of said exit instruction that the thread to which the returned time slot is being returned is the supervisor thread.

12. The processor of claim 8, wherein one or more instructions of the instruction set including at least said exit instruction are reserved for use by the worker threads and not executable by the supervisor thread.

13. The processor of claim 1, wherein the supervisor thread is configured to perform a barrier synchronization for synchronising the worker threads.

14. The processor of claim 1, wherein the supervisor thread is configured to perform communication with an external resource on behalf of one or more of the worker threads.

15. The processor of claim 2, wherein the relinquish instruction further copies one or more modes from one or more status registers of the supervisor context register set to a corresponding one or more status registers of the worker launched by the relinquish instruction, thereby controlling the worker to adopt said one or more modes.

16. The processor of claim 1, wherein the processor is further configured to execute an instruction which launches a set of more than one worker thread together in respective ones of said slots, all executing the same code.

17. The processor of claim 4, wherein the instruction set which the processor is configured to execute further includes a multi-run instruction which launches a plural number of worker threads together in respective ones of said slots, the plural number of worker threads being three or more; wherein one of the worker threads comprises code fetched from a first address specified by an operand of the multi-run instruction, and wherein the others of the plural number of worker threads comprise code fetched from respective addresses strided apart in steps of a stride value relative to the first address, wherein the stride value is specified by another operand of the multi-run instruction.

18. The processor of claim 17, wherein said number of worker threads is equal to the number time slots.

19. A method of operating a processor, the method comprising:
using an execution unit to execute a respective thread in each of a repeating sequence of different time slots, the sequence consisting of a plural number of time slots in which the execution logic is operable to interleave execution of the respective threads;
wherein the processor comprises a plural number of context register sets, each comprising a respective set of registers for representing a respective state of a respective thread, wherein the context register sets comprise a respective worker context register set for each of the number of time slots the execution unit is operable to interleave in said sequence and at least one extra context register set, such that the number of context register sets is at least one greater than the number of time slots the execution unit is operable to interleave, the worker context register sets being used to represent the respective states of respective worker threads which perform computation tasks, and the extra context register set being used to represent the state of a supervisor thread which schedules execution of the tasks performed by the worker threads; and
the method further comprises beginning running the supervisor thread in each of the time slots, and the supervisor thread then individually relinquishing each of the time slots in which it is running to a respective one of the worker threads.

* * * * *